Figure 1:
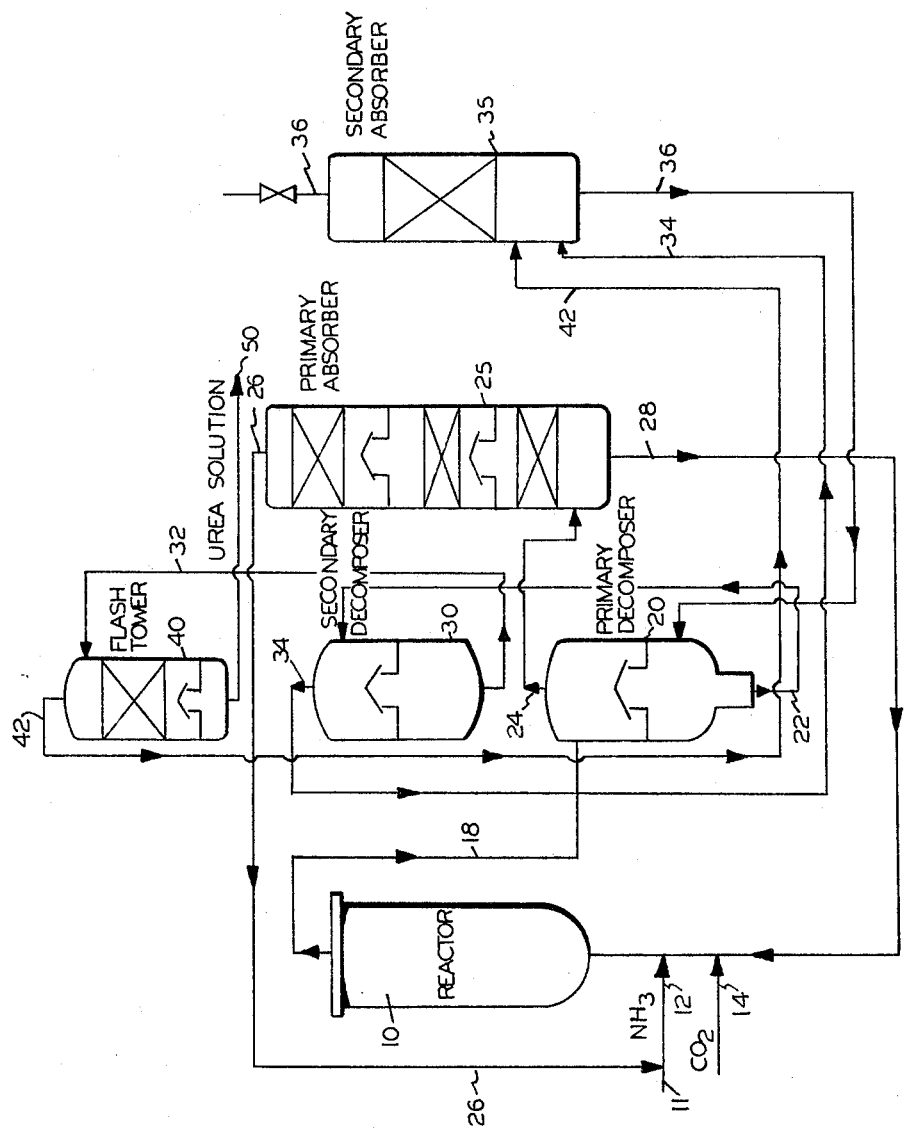

United States Patent Office 3,281,464
Patented Oct. 25, 1966

3,281,464
UREA PURIFICATION WITH RECOVERY OF
AMMONIA AND CARBON DIOXIDE
Utah Tsao, Jersey City, N.J., assignor to The Lummus
Company, New York, N.Y., a corporation of Delaware
Filed Sept. 8, 1961, Ser. No. 136,794
2 Claims. (Cl. 260—555)

The present invention relates to the retardation of biuret formation in the production of urea, and more particularly to the retardation of biuret formation in the purification of the urea reactor effluent, especially during recovery of residual ammonia and carbon dioxide therefrom.

It is well known that when ammonia and carbon dioxide are reacted at high temperatures under pressure urea is formed. Urea synthesis reactions have, for example, been conducted at temperatures ranging between 160° C. and 220° C. and pressures between 200 and 500 atmospheres.

During the urea synthesis reaction, ammonia and carbon dioxide combine primarily to form ammonium carbamate in accordance with the following equation:

I    $2NH_3 + CO_2 \rightleftharpoons NH_2COONH_4$

At the temperature of the reaction, ammonium carbamate readily decomposes to form urea and water.

II    $NH_2COONH_4 \rightleftharpoons NH_2CONH_2 + H_2O$

The effluent of the urea synthesis reaction will normally contain urea, water, ammonium carbamate, and both dissolved and undissolved gases. This effluent must, therefore, be purified to provide a commercial grade urea. In purifying the effluent, the ammonium carbamate remaining therein must be decomposed prior to separation of the dissolved and undissolved gases. Normally this decomposition is carried out by heating the effluent under pressure, after which the effluent is passed into an absorber to remove the gases contained therein. A second decomposition stage may be used if needed. Even when using two such stages, however, about 1% ammonia and 1% carbon dioxide will remain in the effluent following the second stage to be lost when concentrating the urea solution in an evaporating system.

Also, prolonged heating of the effluent to purify the same is undesirable since urea decomposes upon heating to form biuret and ammonia.

III    $2NH_2CONH_2 \rightleftharpoons NH_2CONHCONH_2 + NH_3$

Since the usual purification of the effluent involves the application of heat, it is necessary to strictly control the speed with which the effluent passes through the decomposition stages to avoid the formation of biuret. Some biuret will always be formed, however. Synthetic technical urea, for example, contains between 1 and 2% biuret.

The presence of biuret in urea is highly undesirable in many industrial applications of urea and its production is to be avoided if at all possible. In textile finishings, for example, biuret causes turbidity of the treating solutions, and subsequently, destroys the brilliance of the finish.

Also, biuret has a pronounced herbicidal action which is most disadvantageous in farming. The biuret content in urea fertilizers has a direct relationship with the destruction of agricultural products. For this reason, biuret has been disclaimed as a safe ingredient in fertilizers which are to be applied to agricultural products for use as foods.

It is, therefore, an object of the present invention to provide a process wherein a pure and cool urea solution having a low biuret content is prepared from the effluent from a urea synthesis reactor. Being cooled, biuret will not form as readily in storage or during any subsequent centrifugation, filtration, pumping or surging to which the solution may be subjected to remove oil traces accumulated in the synthesis and flashing apparatus and conduits.

It is a further object of the present invention to provide a process for the retardation of biuret formation in a urea synthesis effluent and for the recovery of substantially all of the residual ammonia and carbon dioxide therefrom. The yield of the process is improved by preventing the loss of the residual ammonia and carbon dioxide content in the urea effluent solution and easy handling of the product in an operating area free from contamination by ammonia vapor is made possible.

This contrasts widely with the previously known urea recovery processes, such as the vacuum crystallization method, by which residual ammonia and carbon dioxide cannot be economically recovered from the urea solution, being dissolved in the large quantities of evaporated water.

Figure 2:
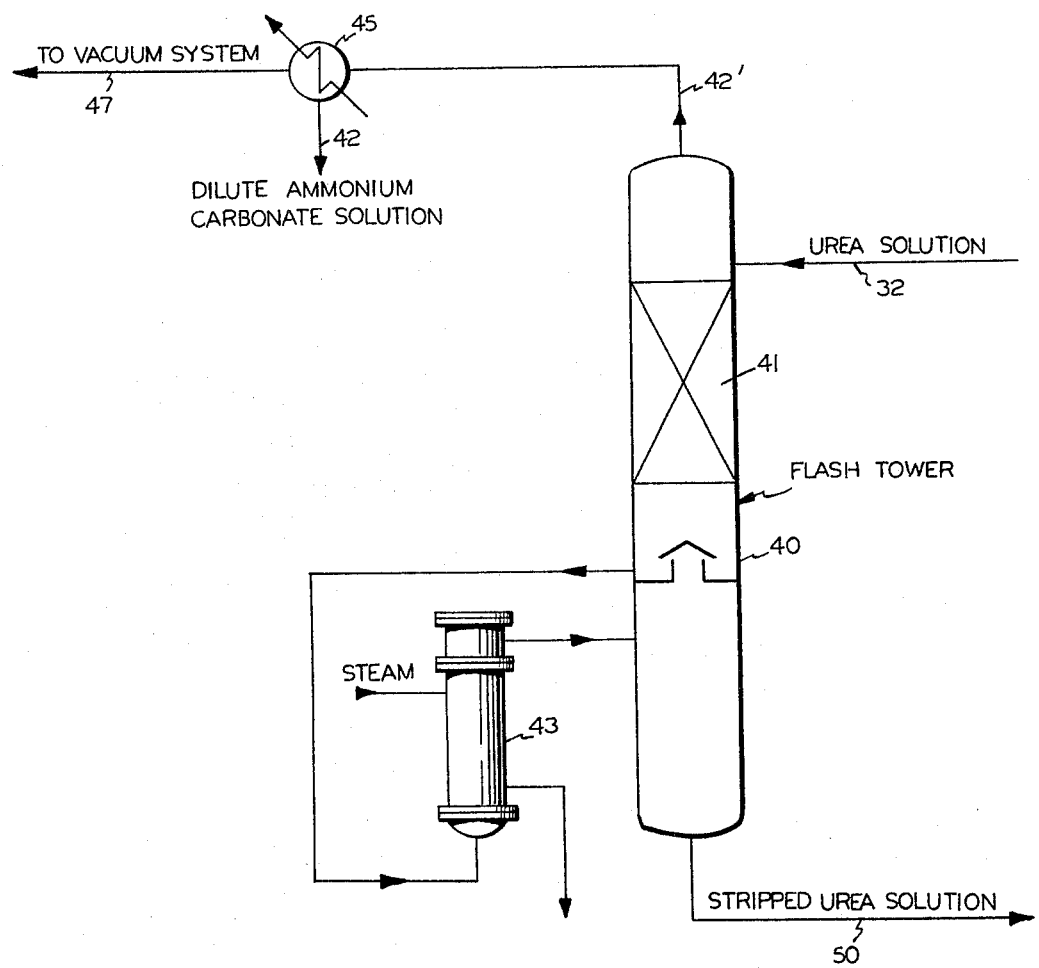

Other objects and a better understanding of the invention may be had by referring to the following description taken in conjunction with the accompanying drawing in which:

FIG. 1 is a schematic flow diagram illustrating a preferred embodiment of my invention for producing low biuret urea, and FIGURE 2 is a more detailed illustration of a flash tower as shown in FIGURE 2.

The process according to the present invention results in a urea product solution which contains no more than 0.6 to 0.8% of biuret and only traces of ammonia and carbon dioxide. The product urea solution is obtained by utilizing in the urea synthesis process a flash tower wherein the temperature of the urea solution is very rapidly lowered under moderate vacuum to between approximately 70° and 80° C. At this temperature the biuret-forming reaction is practically halted and the urea solution can be safely stripped of substantially its entire ammonia and carbon dioxide content without appreciably increasing the biuret content. The ammonia and carbon dioxide salvaged by stripping may be reused by conducting them into the reactant recovery system.

Referring now to FIGURE 1, this figure illustrates a conventional urea synthesis reactor which will operate under conditions of high temperature, and pressure to produce a urea solution from a feed of ammonia and carbon dioxide entering through lines 12 and 14, respectively. The urea solution formed in the reactor 10 contains urea, ammonium carbamate, water and residual carbon dioxide and ammonia. The ammonium carbamate must thereafter be decomposed to form additional urea and the residual ammonia and carbon dioxide must be removed to provide a pure urea solution which can be further treated to provide commercial urea products.

To decompose the ammonium carbamate contained in the urea solution and to remove the residual ammonia and carbon dioxide, the urea solution then passes through a three stage recovery process. The three stages of the purification process include a primary decomposer 20, a secondary decomposer 30 and a flash tower 40.

In the first stage of the purification process, the urea solution from the reactor 10 passes through line 18 to the primary decomposer 20 wherein it is heated under moderate pressure to decompose the ammonium carbamate in accordance with Equation II hereinabove. The speed with which the solution passes through the primary decomposer is controlled in the conventional manner to avoid biuret formation. The partially degassed urea solution produced in the primary decomposer 20 passes through line 22 to the secondary decomposer 30.

A gaseous fraction is also produced in the primary decomposer 20. This gaseous fraction consists primarily of ammonia which is prepared for reuse in the reactor 10 by a primary absorber 25. Line 24 conveys this gaseous fraction to the primary absorber 25. Passing from the primary absorber through line 26, reclaimed ammonia produced in the absorber 25 is recycled back to the reactor 10 and is combined with a fresh ammonia feed in line 11 to form the ammonia feed stream in line 12 for the reactor 10. The liquid fraction produced in the primary absorber is also recycled to the reactor 10 through line 28 to form a part of the feed therefor.

The urea solution passing from the primary decomposer 20 through line 22 to the secondary decomposer 30 is further degassed in the secondary decomposer and is passed therefrom through line 32 to the flash tower 40 wherein it is stripped of essentially all the remaining residual gases. The solution in the secondary decomposer will be heated to moderate temperatures under approximately atmospheric pressure for a short length of time to decompose essentially all the remaining ammonia carbamate and remove most of the remaining residual gases which pass from the secondary decomposer through line 34 to a secondary absorber 35 in accordance with well known techniques. Some residual gases, however, will remain in the urea solution thus treated since the solution cannot be retained in this second stage for very long without the formation of biuret.

After decomposition of the effluent in decomposers 20 and 30 to remove most of its residual gas content, the remaining residual ammonia and carbon dioxide is removed in flash tower 40. Flash tower 40 is operated under moderate vacuum at temperatures between approximately 70° and 80° C. so that there is no appreciable increase in biuret content of the solution. The solution from secondary decomposer 30 enters flash tower 40 through line 32. A stripping medium provided by reboiling the bottoms in flash tower 40 strips the residual ammonia and carbon dioxide content of the solution in the stripping zone of tower 40. The overhead from tower 40 leaves in line 42 and comprises a gaseous fraction including stripping medium, ammonia, carbon dioxide and water vapor.

This gaseous fraction contains substantially all of the residual ammonia and carbon dioxide content in the urea solution as it enters tower 40. The stripped and cooled urea product solution leaving as tower 40 bottoms thus contains only traces of ammonia and carbon dioxide. Referring to FIGURE 1, the gaseous fraction in line 42 passes to secondary absorber 35 for recovery and recirculation to the reactor feed stream. A very small vent gas stream is removed from the secondary absorber through line 36 bottoms from absorber 35 being recycled in line 37.

FIGURE 2 illustrates in detail a flash tower for use in the process of FIGURE 1 including associated apparatus necessary for its operation in the manner indicated above. Flash tower 40 operates under a moderate vacuum maintained via line 47 by a vacuum system (not shown). A urea solution enters the flash tower through line 32. The flash tower is maintained at a temperature of between 70° and 80° C. so that as the urea-rich aqueous solution in the tower passes through stripping section 41 it is rapidly cooled so that the residual ammonia and carbon dioxide contents may be stripped therefrom without any appreciable increase of biuret. The ammonia and carbon dioxide are stripped by a stripping medium obtained by reboiling the tower bottoms. The gaseous fraction produced in the flash tower passes through line 42' to a condenser 45. The condenser provides a liquified dilute ammonium carbonate solution which passes through line 42 to the secondary absorber 34 (see FIGURE 1). The stripped urea solution passes from the tower 40 through line 50 to a urea recovery section (not shown). A steam heated-reboiler 43 is provided to furnish the heat requirements of flash tower 40. The reboiler vaporizes a portion of the urea-rich aqueous solution for use as the stripping medium in stripping section 41 of the tower.

The vacuum system (not shown) is attached to the condenser 45 through line 47. This vacuum system maintains the moderate vacuum required in flash tower 40.

A specific example of the preferred mode of operation is given below. This example is for purposes of illustration only and is not to be considered as limiting the invention in any way.

*Example*

Ammonia, carbon dioxide and a recycle stream were fed to the urea synthesis reactor 10.

The liquid and gaseous fractions produced in the secondary decomposer 30 had the following compositions

|  | Liquid, percent | Gaseous, percent |
|---|---|---|
| $NH_3$ | 0.8 | 47.0 |
| $CO_2$ | 1.0 | 23.0 |
| $H_2O$ | 33.4 | 30.0 |
| Urea | 64.8 | |

The secondary decomposer operated at a temperature of 124° C. and at pressure of 9.9 p.s.i.g.

The urea-rich liquid fraction passing through line 32 was further degassed in the flash tower 40 to remove the remaining ammonia and carbon dioxide. The flash tower 40 was operated at a temperature of 80° C. and a less than atmospheric pressure of 4.3 p.s.i.a. A urea solution of the following composition (wt. percent) was produced therein.

Urea-rich solution
Inerts: Percent
$NH_3$ ------------------------------------- Trace
$CO_2$ ------------------------------------- Trace
$H_2O$ ------------------------------------- 28.4
Urea ------------------------------------- 71.6

A gaseous fraction produced in the flash tower 40 having the composition

Percent
$NH_3$ ------------------------------------- 8.1
$CO_2$ ------------------------------------- 10.1
$H_2O$ ------------------------------------- 81.8 was passed through line 42 to the secondary absorber 35.

The secondary absorber 35 which was fed from the secondary decomposer 30, flash tower 40, was operated at a temperature of about 35° C. and a pressure of 8.5 p.s.i.g. The liquid fraction produced therein having the composition Percent
$NH_3$ ------------------------------------- 19.1
$CO_2$ ------------------------------------- 11.2
$H_2O$ ------------------------------------- 45.5
Urea ------------------------------------- 24.2 was recycled through line 37 to the primary decomposer 20.

Although a preferred embodiment of my invention has been set forth above, many modifications and variations will be obvious to those skilled in the art. Accordingly, the invention is not to be construed with any limitations other than those recited in the appended claims.

I claim:

1. A process for preparing a urea solution substantially free of residual amounts of ammonia and carbon dioxide from a urea-rich liquid fraction containing essentially urea, water, ammonia and carbon dioxide, which comprises; passing said urea-rich liquid fraction into a treating zone maintained under a moderate vacuum, rapidly reducing the temperature of said fraction in said zone to a temperature between approximately 70° to 80° C., separately vaporizing a portion of said fraction passing through said zone to provide a stripping medium comprising a major portion of water vapor, stripping said fraction in said zone of essentially all of said ammonia and carbon dioxide without appreciably increasing the biuret content of said fraction by passing said stripping medium into contact with said liquid fraction in said zone, recovering the ammonia and carbon dioxide withdrawn from said zone with said stripping medium and recycling the same to produce further quantities of urea, and recovering a urea solution substantially free of residual amounts of ammonia and carbon dioxide.

2. In a process for the production of a low biuret content urea solution which comprises reacting ammonia and carbon dioxide in a urea autoclave at high temperatures and pressures to form a reaction mixture consisting essentially of urea, ammonium carbamate, water, and unreacted ammonia and carbon dioxide, heating said reaction mixture at a moderate pressure to decompose a portion of said ammonium carbamate, separating from said reaction mixture a first gaseous fraction rich in ammonia and carbon dioxide and an aqueous urea-rich liquid fraction, further heating said liquid fraction at a moderate temperature for a relatively short period of time at substantially atmospheric pressure to decompose the remaining portion of ammonium carbamate, separating a second gaseous fraction rich in ammonia and carbon dioxide and withdrawing a urea solution containing residual amounts of ammonia and carbon dioxide, the improvement which comprises; passing said urea solution into a treating zone maintained under a moderate vacuum and very rapidly reducing the temperature of said solution in said zone to a temperature between approximately 70° C. to 80° C., passing a portion of said solution through a vaporizing zone to provide a stripping medium comprising a major portion of water vapor, stripping from said urea solution the residual amounts of ammonia and carbon dioxide by contacting the liquid portion of said solution with said stripping medium; and recovering a urea solution substantially free of residual amounts of ammonia and carbon dioxide; and recovering and recycling said stripping medium and contained ammonia and carbon dioxide to produce further quantities of urea.

References Cited by the Examiner

UNITED STATES PATENTS

| | | | |
|---|---|---|---|
| 3,053,891 | 9/1962 | Cook et al. | 260—555 |
| 3,091,637 | 5/1963 | Cook et al. | 260—555 |

FOREIGN PATENTS

| | | |
|---|---|---|
| 224,126 | 4/1956 | Australia. |
| 1,200,634 | 12/1959 | France. |

OTHER REFERENCES

Redemann et al., Ind. and Eng. Chem., vol. 50, No. 4, April 1958, pages 633–6.

ALEX MAZEL, *Primary Examiner.*

NICHOLAS S. RIZZO, *Examiner.*

H. R. JILES, *Assistant Examiner.*